United States Patent
Campagna et al.

(10) Patent No.: US 10,781,634 B2
(45) Date of Patent: Sep. 22, 2020

(54) CABLE GUIDED SHADE HEM BAR TO CABLE ATTACHMENT

(71) Applicant: Crestron Electronics, Inc., Rockleigh, NJ (US)

(72) Inventors: Michael Campagna, Woodcliff Lake, NJ (US); Fang Lin, Staten Island, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 393 days.

(21) Appl. No.: 15/880,037

(22) Filed: Jan. 25, 2018

(65) Prior Publication Data

US 2019/0226555 A1 Jul. 25, 2019

(51) Int. Cl.
| | | |
|---|---|---|
| *E06B 9/58* | (2006.01) |
| *E06B 9/34* | (2006.01) |
| *E06B 9/42* | (2006.01) |
| *E06B 9/88* | (2006.01) |
| *F16G 11/10* | (2006.01) |
| *E06B 9/262* | (2006.01) |
| *F16G 11/12* | (2006.01) |

(52) U.S. Cl.
CPC ............... *E06B 9/58* (2013.01); *E06B 9/34* (2013.01); *E06B 9/42* (2013.01); *E06B 9/88* (2013.01); *E06B 2009/2622* (2013.01); *E06B 2009/583* (2013.01); *E06B 2009/587* (2013.01); *E06B 2009/885* (2013.01); *F16G 11/10* (2013.01); *F16G 11/12* (2013.01)

(58) Field of Classification Search
CPC ............ E06B 9/58; E06B 2009/583; E06B 2009/587; E06B 9/42; E06B 9/88; E06B 9/34; E06B 2009/885; E06B 2009/2622
See application file for complete search history.

(56) References Cited

U.S. PATENT DOCUMENTS

| | | |
|---|---|---|
| 449,042 A | 3/1891 | Haswell |
| 471,114 A | 3/1892 | Haswell |

(Continued)

OTHER PUBLICATIONS

WT Shade, Shading Accessories Reference Guide, 2016 (Year: 2016).*

(Continued)

*Primary Examiner* — Katherine W Mitchell
*Assistant Examiner* — Abe Massad
(74) *Attorney, Agent, or Firm* — Crestron Electronics, Inc.

(57) ABSTRACT

A hem bar of a cable guided shade adapted to be removably attached to a pair of cables secured along opposite sides of a structural opening. The hem bar comprises a pair of cable engaging portions disposed at two opposite ends of the hem bar. Each cable engaging portion comprises a tubular body with a longitudinal channel extending therein and a slot traversing the tubular body from the top end to the bottom end of the tubular body. The hem bar may removably and slidably engage the pair of cables by twisting the hem bar in a first direction to align each slot in the cable engaging portions with a length of the respective cable, inserting the cables through the slots into the channels in the cable engaging portions of the hem bar, and twisting the hem bar in a second direction, opposite the first direction, to capture the cables within the channels in the cable engaging portions.

18 Claims, 6 Drawing Sheets

(56) References Cited

U.S. PATENT DOCUMENTS

| | | | |
|---|---|---|---|
| 493,162 A | 3/1893 | Haswell | |
| 595,563 A | * 12/1897 | Forsyth | E06B 9/58 |
| | | | 160/277 |
| 771,179 A | 9/1904 | Scheif | |
| 808,242 A | 12/1905 | Jordan | |
| 984,313 A | 2/1911 | Stiles | |
| 1,169,803 A | 2/1916 | Greenberg | |
| 1,407,624 A | * 2/1922 | Bailey | E06B 9/66 |
| | | | 160/278 |
| 1,787,482 A | 4/1928 | Kimbell | |
| 1,729,158 A | * 9/1929 | Dunn | B60J 3/005 |
| | | | 160/393 |
| 1,841,730 A | 3/1930 | Hamm | |
| 1,797,162 A | 3/1931 | Stuber | |
| 1,807,769 A | 6/1931 | Wileman | |
| 1,912,579 A | 8/1932 | Hamm | |
| 1,986,773 A | 10/1932 | Hamm | |
| 2,139,950 A | * 12/1938 | Galley | E06B 9/262 |
| | | | 160/207 |
| 2,438,101 A | 3/1948 | Wright | |
| 2,572,847 A | 10/1951 | Ehret | |
| 3,721,285 A | 3/1973 | Debs | |
| 4,865,109 A | 9/1989 | Sherman | |
| 4,967,824 A | 11/1990 | Colson et al. | |
| 5,306,885 A | 4/1994 | Utke | |
| 6,918,425 B2 | 7/2005 | Nien | |
| 7,000,672 B2 | 2/2006 | Nien | |
| 7,117,918 B2 | 10/2006 | Franssen | |
| 7,971,625 B2 | 7/2011 | Garmyn | |
| 8,270,152 B2 | 9/2012 | Haigh | |
| 8,622,112 B2 | 1/2014 | Tremaine, III et al. | |
| 8,887,789 B2 | 11/2014 | Tremaine, III et al. | |
| 9,382,756 B2 | 7/2016 | Cheringal et al. | |
| 9,637,973 B1 | 5/2017 | Berman et al. | |
| 2013/0000087 A1 | 1/2013 | Finckh-Jung et al. | |
| 2013/0233500 A1 | 9/2013 | Chen | |
| 2014/0138036 A1 | 5/2014 | de Vries et al. | |
| 2016/0290039 A1 | 10/2016 | Cheringal et al. | |

OTHER PUBLICATIONS

Lutron Electronics Co., Inc., Cable Guided Roller Shade Install Guide, P/N 045-336 Rev B, 2010.

Roll-A-Shade, Exterior System, R-8.1, Aug. 14, 2013.

* cited by examiner

CABLE GUIDED SHADE HEM BAR TO CABLE ATTACHMENT

BACKGROUND OF THE INVENTION

Technical Field

Aspects of the embodiments relate to shades, and more particularly to systems, methods, and modes for a cable guided shade hem bar to cable attachment.

Background Art

Roller shades are effective in screening windows, doors, or the like, to achieve privacy and thermal effects. A roller shade typically includes a rectangular shade material, such as fabric, attached at its top end to a cylindrical rotating tube, called a roller tube, and at an opposite bottom end to a hem bar. The shade material is wrapped around the roller tube. The roller tube is rotated, either manually or via an electric motor, in a first direction to roll down the shade material to cover a window and in a second direction to roll up the shade material to uncover the window.

In typical roller shades the bottom end of the fabric is free hanging. Another type of shade, called a cable guided shade, utilizes cable guides where the free end of the shade is secured and travels along two parallel cables. Cable guided shades are implemented for a variety of reasons. In some homes and commercial buildings, windows are being installed that are angled toward or out from the room. In a typical roller shade, however, the fabric will roll up and down perpendicular to the floor or the window sill. In such cases it is desirable to have the fabric hang and travel parallel to the window such that the fabric is sloped at the same angle as the window. This is commonly achieved by having the fabric ride in a channel or have cables to guide it.

Cable guided shades are also useful to keep the shade fabric in place in areas that are drafty because of open windows or areas that have HVAC ductwork blowing on the shade. In addition, cable guides are used on shades that have a large height to width ratio (i.e., very skinny, tall shades) to prevent the shade from swaying side to side. Shades that are tall and skinny are prone to swaying, which leads to the fabric telescoping off one end of the tube, leading to frayed fabric.

Cable guided shades are typically implemented by including two endcaps connected to the bottom hem bar with protruding loops. A cable guided shade is typically mounted in a window between two mounting brackets. Two cables are then looped through the protruding loops of the hem bar. The cables are then secured to the top and bottom of the window and tensioned such that they are disposed adjacent and parallel to the side window jambs. Such installation is cumbersome and requires the roller shade to be installed in the mounting brackets during installation of the cables. Any manipulation of the fabric required during installation may cause damage to the fabric. In addition, conventional cable guided shades are difficult to service or replace, as the entire cable tensioned assembly needs to be disassembled.

Accordingly, a need has arisen for a system for simplifying the process of securing a hem bar of a cable guided shade to the cable guides without causing damage to the shade material.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a cable guided shade hem bar to cable attachment that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments a cable guided shade is provided adapted to adjustably cover a structural opening. The cable guided shade comprises a pair of cables, a shade material, a shade drive unit, and a hem bar. The pair of cables are adapted to be secured along opposite sides of the structural opening. The shade material extends from a top end and a bottom end. The shade drive unit is operably connected to the top end of the shade material and is adapted to raise and lower the shade material to adjustably cover the structural opening. The hem bar is connected across a width of the bottom end of the shade material and comprises a pair of cable engaging portions disposed at two opposite ends of the hem bar. Each cable engaging portion comprises a tubular body with a longitudinal channel extending therethrough and a slot traversing the tubular body from a top end of the tubular body to a bottom end of the tubular body. Each cable engaging portion is adapted to removably and slidably engage one of the secured cables within the channel by receiving a length of the respective cable trough the slot into the channel.

According to an embodiment, each cable may be secured between a cable mounting bracket and a cable anchor, wherein each cable mounting bracket comprises a tensioning device adapted to adjustably tension the secured cable. The cables may be tensioned before being removably engaged by the cable engaging portions of the hem bar.

According to an embodiment, the hem bar comprises a pair of endcaps attached to the two opposite ends of the hem bar, wherein each endcap comprises one of the cable engaging portions. Each endcap may comprise a hem bar mounting portion adapted to be removably attached to one of the ends of the hem bar. According to another embodiment, the cable engaging portions may be integrated with the hem bar forming a single hem bar body. According to an embodiment, the tubular body of each cable engaging portion comprises at least one of a rectangular cross section, an oval cross section, a circular cross section, and a square cross section.

According to an embodiment, each channel is aligned along a first plane, and wherein each slot is aligned substantially along a second plane that is offset from the first plane. The hem bar may be adapted to engage the pair of secured cables by: twisting the hem bar in a first direction to align the slots of the cable engaging portions with the lengths of the cables; inserting the cables through the slots into the channels in the cable engaging portions of the hem bar; and twisting the hem bar in a second direction, opposite the first direction, to capture the cables within the channels in the cable engaging portions. According to an embodiment, when the cables are engaged within the channels of the cable engaging portions, the cables are substantially aligned along the first plane such that they cannot exit the slots that are aligned substantially along the second plane.

According to an embodiment, wherein each slot may comprise a Z-shaped opening into the channel. According to an embodiment, the channel in the tubular body may be defined by a first side wall and an oppositely disposed second side wall interconnected by a front wall and a rear wall. The first side wall may comprise a profile adapted to cover and attach to one of the ends of the hem bar. According to an embodiment, the slot may comprise a Z-shaped opening formed through the second side wall of the tubular body. According to a further embodiment, each slot may comprise a diagonal opening traversing the second side wall. Each slot may further comprise a first notch in the front wall proximate to the top end of the tubular body creating a first notched opening between the first notch and the second side wall, and a second notch in the rear wall proximate to the bottom end of the tubular body creating a second notched opening between the second notch and the second side wall, wherein the diagonal opening extends from the first notched openings to the second notched opening. Each of the first and second notched openings may comprise a width larger than a width of one of the cables such that the length of the cable can pass through the first and second notched openings. According to an embodiment, the hem bar is adapted to engage the pair of secured cables by: twisting the hem bar in a first direction to align the diagonal openings of the slots of the cable engaging portions with the lengths of the cables; inserting the cables through the diagonal openings and through the first and second notched openings of the slots into the channels in the cable engaging portions of the hem bar; and twisting the hem bar in a second direction, opposite the first direction, to capture the cables within the channels in the cable engaging portions. Each slot may comprise a width larger than a width of one of the cables such that the length of the cable can pass through a length of the slot.

According to another aspect of the embodiments, a cable guided shade is provided adapted to adjustably cover a structural opening. The cable guided shade comprises a pair of cables, a shade material, a shade drive unit, and a hem bar. The pair of cables are adapted to be secured along opposite sides of the structural opening. The shade material extends from a top end and a bottom end. The shade drive unit is operably connected to the top end of the shade material and adapted to raise and lower the shade material to adjustably cover the structural opening. The hem bar is connected across a width of the bottom end of the shade material and comprises a pair of cable engaging portions disposed at two opposite ends of the hem bar. Each cable engaging portion comprises a tubular body with a longitudinal channel extending therethrough that is aligned with a first plane and a slot traversing the tubular body from a top end of the tubular body to a bottom end of the tubular body, wherein the slot is substantially aligned with a second plane that is offset from the first plane of the longitudinal channel. The hem bar is adapted to removably and slidably engage the pair of cables by: twisting the hem bar in a first direction to align each slot in the cable engaging portions with a length of the respective cable; inserting the cables through the slots into the channels in the cable engaging portions of the hem bar; and twisting the hem bar in a second direction, opposite the first direction, to capture the cables within the channels in the cable engaging portions.

According to another aspect of the embodiments, a hem bar for a cable guided shade is provided adapted to be removably attached to a pair of cables secured along opposite sides of a structural opening. The hem bar comprises a pair of cable engaging portions disposed at two opposite ends of the hem bar. Each cable engaging portion comprises a tubular body with a longitudinal channel extending therein from a top end to a bottom end of the tubular body, wherein the channel is aligned along a first plane; and a slot traversing the tubular body from the top end to the bottom end of the tubular body, wherein the slot is substantially aligned along a second plane that is offset from the first plane. The hem bar is adapted to removably and slidably engage the pair of cables by: twisting the hem bar in a first direction to align each slot in the cable engaging portions with a length of the respective cable; inserting the cables through the slots into the channels in the cable engaging portions of the hem bar; and twisting the hem bar in a second direction, opposite the first direction, to capture the cables within the channels in the cable engaging portions.

According to a further aspect of the embodiments, a method is provided for removably attaching a hem bar of a cable guided shade to a pair of cables secured along opposite sides of a structural opening, wherein the hem bar comprises a pair of cable engaging portions disposed at two opposite ends of the hem bar, wherein each cable engaging portion comprises a tubular body with a longitudinal channel extending therein along a first plane and a slot traversing the tubular body along a second plane that is offset from the first plane. The method comprises the steps of: twisting the hem bar in a first direction to align each slot in the cable engaging portions with a length of the respective cable; inserting the cables through the slots into the channels in the cable engaging portions of the hem bar; and twisting the hem bar in a second direction, opposite the first direction, to capture the cables within the channels in the cable engaging portions.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
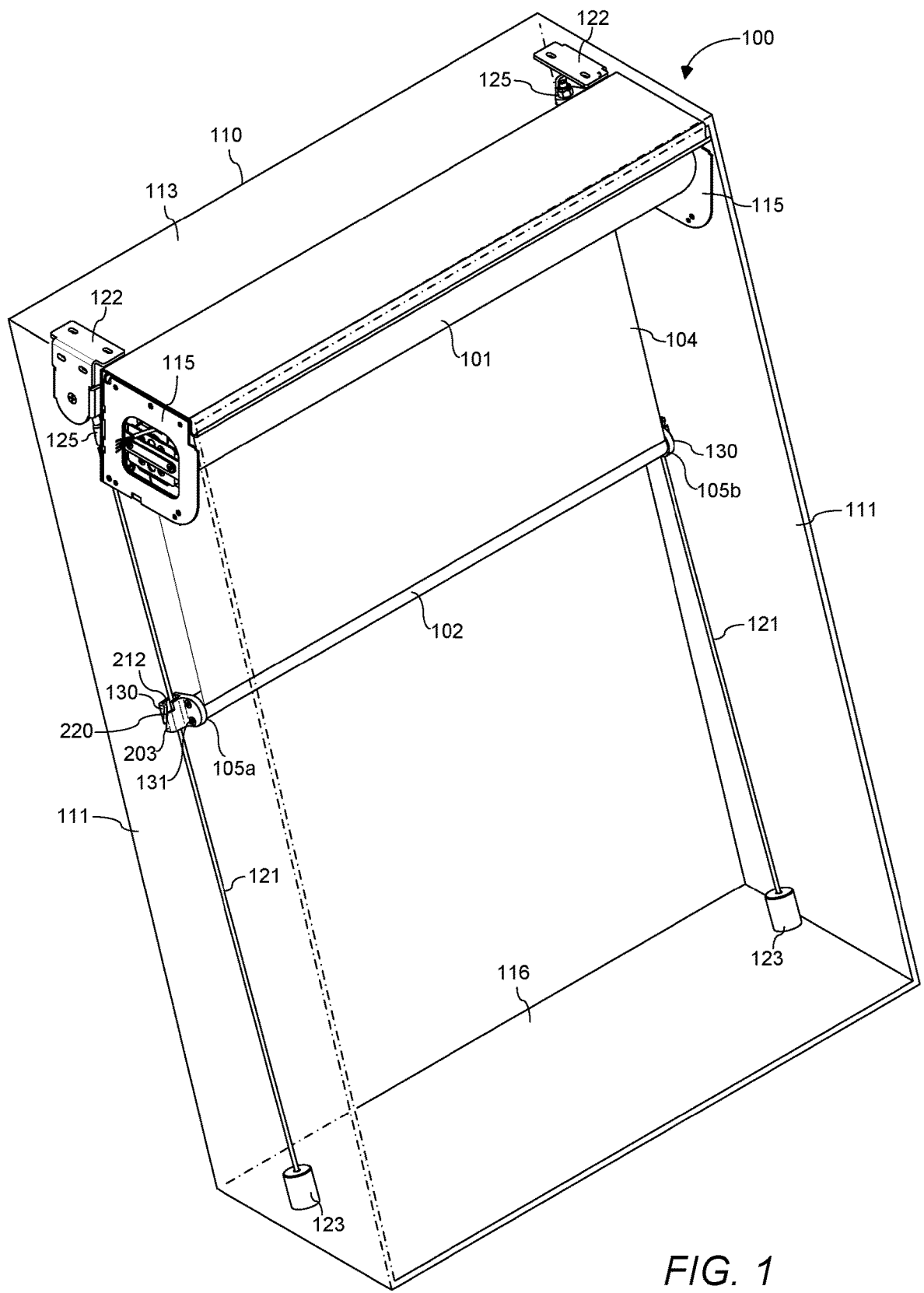

FIG. 1 illustrates a front perspective view of a cable guided roller shade according to one aspect of the embodiments.

Figure 2A:
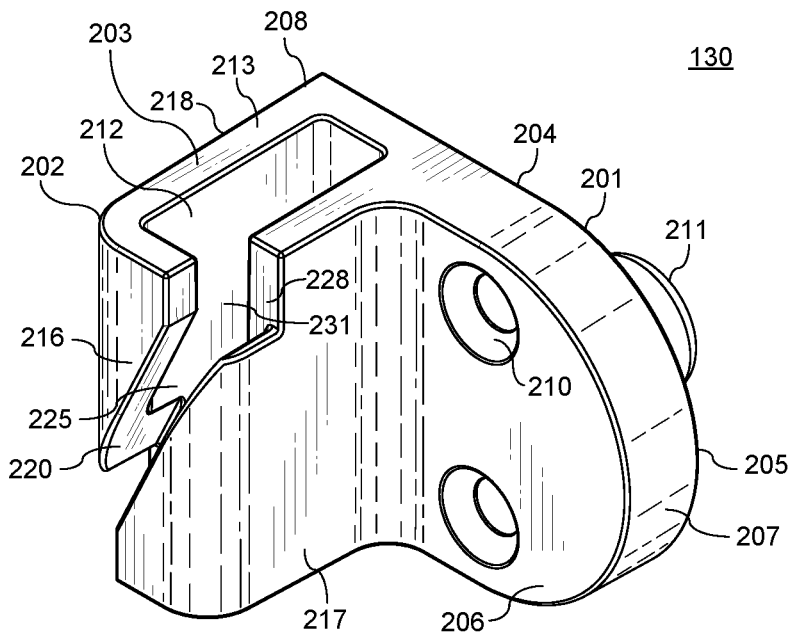

FIG. 2A illustrates a front perspective view of a hem bar endcap of the cable guided roller shade according to one aspect of the embodiments.

Figure 2B:
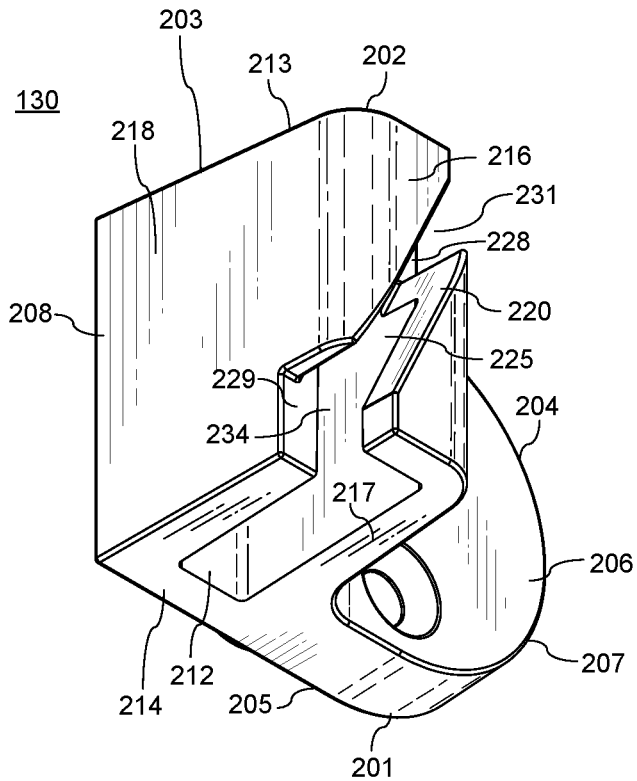

FIG. 2B illustrates a rear perspective view of the endcap according to one aspect of the embodiments.

Figure 2C:
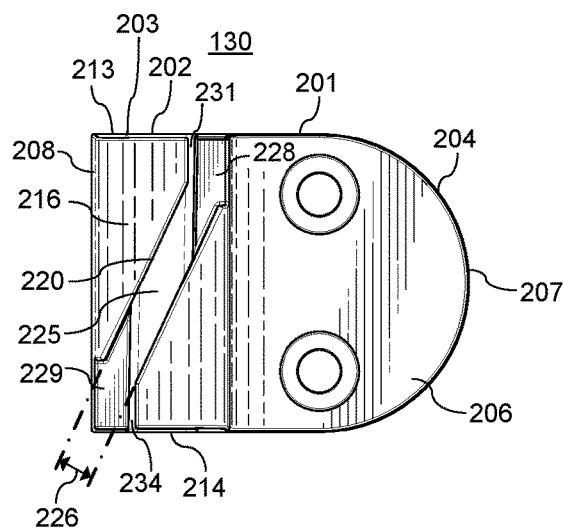

FIG. 2C illustrates a side view of the endcap according to one aspect of the embodiments.

Figure 2D:
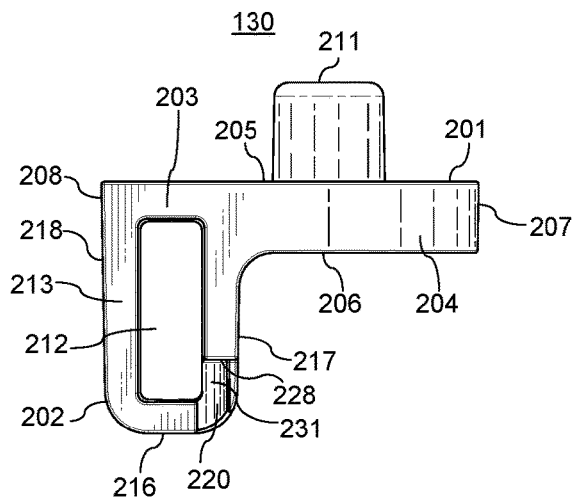

FIG. 2D illustrates a top view of the endcap according to one aspect of the embodiments.

Figure 2E:
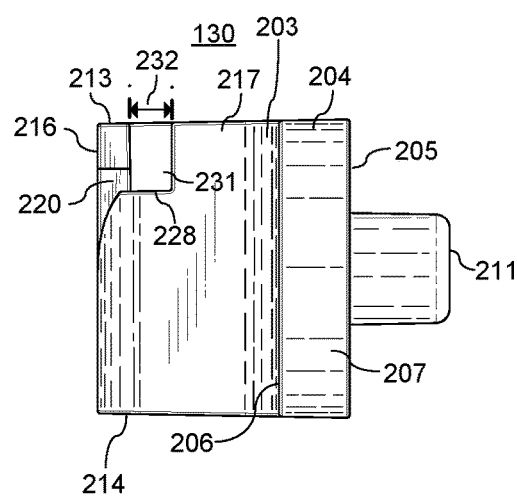

FIG. 2E illustrates a front view of the endcap according to one aspect of the embodiments.

Figure 2F:
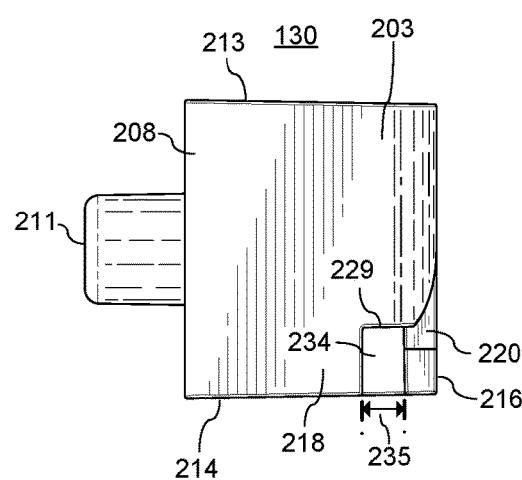

FIG. 2F illustrates a rear view of the endcap according to one aspect of the embodiments.

Figure 3A:
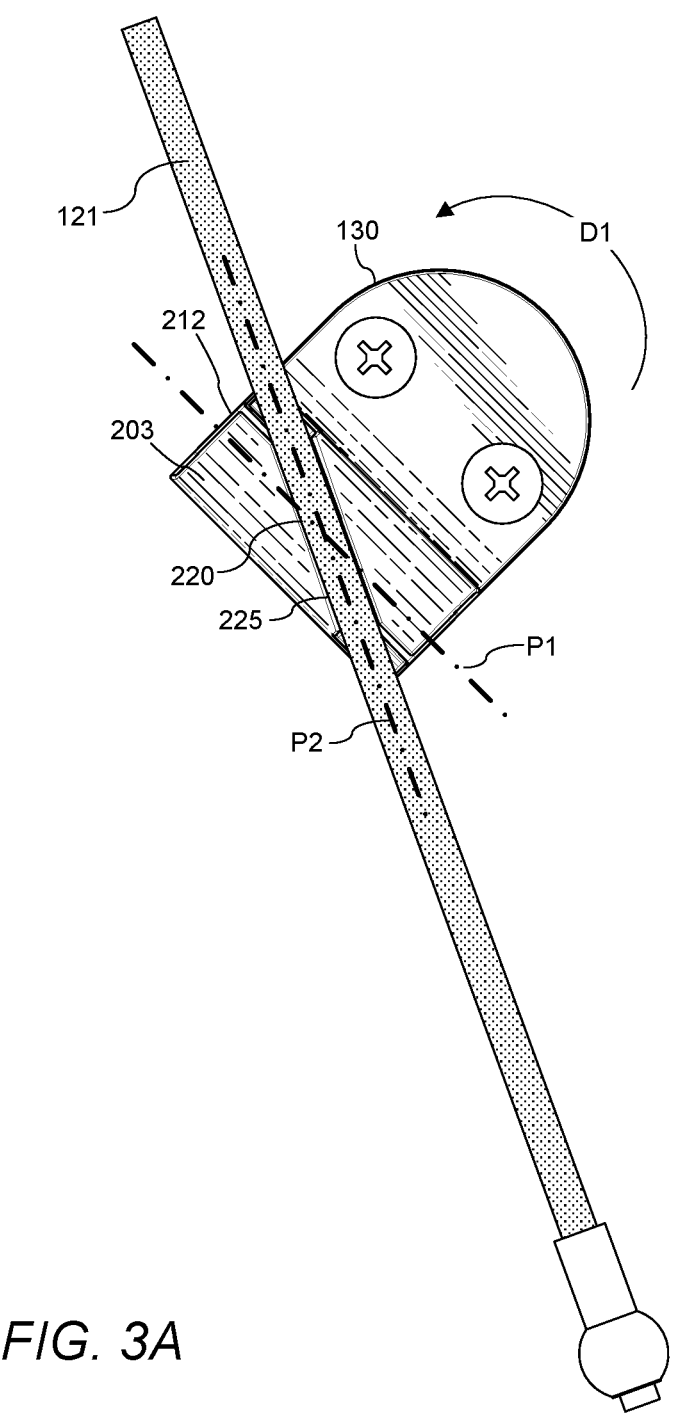

FIG. 3A illustrates a side view of the endcap as well as a side view of a cable aligned with a diagonal opening in the endcap according to one aspect of the embodiments.

Figure 3B:
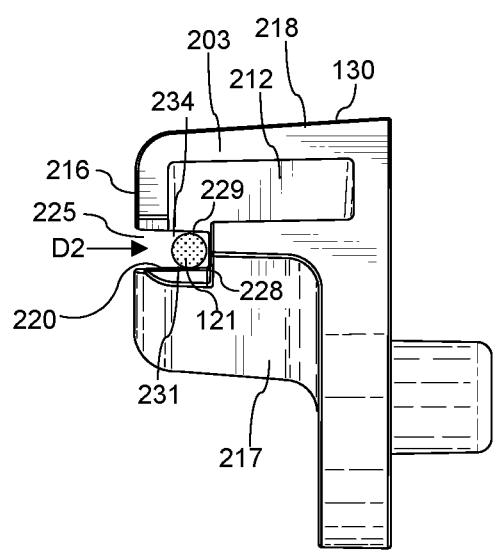

FIG. 3B illustrates an angled top view of the endcap and a cross sectional view of cable looking down directly through the diagonal opening with the cable inserted in the openings formed by the slot in the endcap according to one aspect of the embodiments.

Figure 3C:
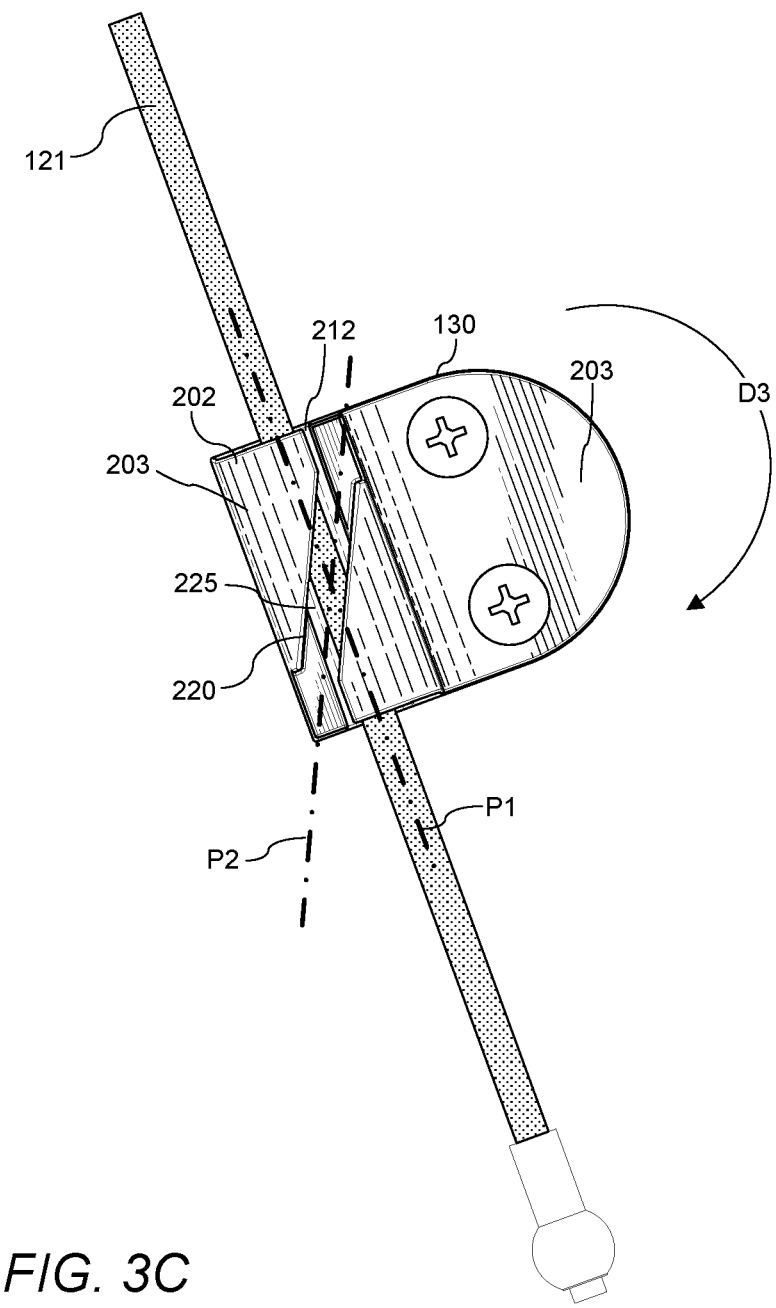

FIG. 3C illustrates a side view of the endcap as well as a side view of the cable captured within the channel in the endcap according to one aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Cable Guided Roller Shade
101 Roller Tube
102 Hem Bar
104 Shade Material
105a First End
105b Second End
110 Window Frame
111 Side Jambs
113 Head Jamb
115 Shade Mounting Brackets
116 Sill
121 Cables
122 Cable Mounting Brackets
123 Cable Anchors
125 Nyloc Nuts
130 Endcaps
131 Screws
201 Hem Bar Mounting Portion
202 Cable Engaging Portion
203 Tubular Body
204 First Side Wall
205 First Surface
206 Second Surface
207 Front End
208 Rear End
210 Orifices
211 Hem Bar Plug
212 Channel
213 Top End
214 Bottom End
216 Second Side Wall
217 Front Wall
218 Rear Wall
220 Slot
225 Diagonal Opening
226 Width
228 First Notch
229 Second Notch
231 First Notched Opening
232 Width
234 Second Notched Opening
235 Width

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of roller shades, but is not limited thereto, except as may be set forth expressly in the appended claims. While the roller shade is described herein for covering a window, the roller shade may be used to cover doors, wall openings, or other openings of a structure. The embodiments described herein may further be adapted in other types of window or door shades, such as inverted rollers, Roman shades, Austrian shades, pleated shades, blinds, shutters, skylight shades, garage doors, or the like.

Referring to FIG. 1, there is shown a front perspective view of a cable guided roller shade 100 according to one embodiment. Roller shade 100 generally comprise a roller tube 101, shade material 104, and a hem bar 102. Shade material 104 is connected at its top end to the roller tube 101 and at its bottom end to the hem bar 102. The roller shade the roller tube 101 may be generally cylindrical in shape. The shade material 104 wraps around the roller tube 101 and is unraveled from the roller tube 101 to cover a window, a door, a wall opening, or other structural opening. In various embodiments, the shade material 104 comprises fabric, plastic, vinyl, or other materials known to those skilled in the art.

According to various embodiments, the shade 100 may comprise a shade drive unit adapted raise or lower the shade material 104 to open or close the structural opening, such as a window frame 110. In a roller shade implementation, the shade drive unit may be received within the roller tube 101 and may be adapted to rotate the roller tube 101 to raise or lower the shade material 104. According to one embodiment, the shade drive unit may comprise a mechanical drive assembly for manual or semi-manual operation of the shade 100, for example, allowing adjusting of the shade 100 by pulling or tugging on the hem bar 102 or by pulling on a chain. According to another embodiment, the shade drive unit may comprise a motor for motorized operation of the shade.

In a motorized implementation of the roller shade 100, the shade drive unit may include a motor control module, a motor, and a drive wheel that fit within the roller tube 101. The motor control module may comprise fully integrated electronics to control the motor, directing the operation of the motor, including its direction, speed, and position. The drive wheel may be connected to the output shaft of the motor to rotate the roller tube 101. In operation, the roller shade 100 is rolled down and rolled up via the roller shade drive unit. As a result, the shade material 104 may be lowered from an opened or rolled up position, when substantially the entire shade material 104 is wrapped about the roller tube 101, to a closed or rolled down position, when the shade material 104 is substantially unraveled.

The roller shade 100 may be mounted within a window frame 110 comprising a pair of side jambs 111 interconnected by a head jamb 113 and a sill 116. The window frame 110 may be oriented orthogonal to a building floor, or as shown in FIG. 1, the window frame 110 may be inclined away from a room, or towards the room. The roller shade 100 is mounted between a pair of side jambs 111 in proximity of the head jamb 113 via a pair of shade mounting brackets 115. Each mounting bracket 115 may be secured to a side jamb 111 via screws. In other embodiments, the roller shade 100 may be mounted on a wall, in front of the frame enclosing a window, a door, an opening, or the like.

The cable guided shade 100 may further comprise a pair of cables 121 adapted to be secured at each side of the roller shade 100 along the length of the side jambs 111. Cables 121 may comprise a metal material, such as stainless steel with nylon coating. The cables 121 may be sized as thin and unobtrusive as possible, while comprising strength allowing the cables 121 to function properly based on the width and weight of the shade 100. For example, each cable 121 may comprise ⅛ inch outer diameter with breaking strength of 900 pounds for support a roller shade with a 20 degree angle off vertical. Each cable 121 may be secured to the window frame 110 between a cable mounting bracket 122 at a top end of the window frame 110 and a cable anchor 123 at a bottom end of the window frame 110.

Each cable anchor 123 is adapted to connect to a bottom end of the cable 121. The cable anchors 123 can then be secured at the bottom end of the window frame 110 to the window sill 116, a bottom end of a side jamb 111, or the floor.

Each cable mounting bracket 122 may be mounted at the top end of the window frame 110 to one of the side jambs 111 and/or the head jamb 113 via screws. Each cable mounting bracket 122 may be mounted adjacent to a respective shade mounting bracket 115 on the respective side jamb 111. According to one embodiment, the cable mounting brackets 122 may be separate from the shade mounting brackets 115 as shown in FIG. 1. According to another embodiment, cable mounting brackets 122 may be integrated with the shade mounting brackets 115.

The top end of each cable 121 may be threaded and may be adjustably secured to a respective cable mounting bracket 122 via a nyloc nut 125. The nyloc nuts 125 are adapted to adjustably tension the cables 121 allowing an installer to ensure that the cables 121 are properly tensioned to reduce sagging of the shade material 104. However, other types of tensioning assemblies or devices may be used, such as turnbuckles, or the like. According to another embodiment, the cable mounting brackets 122 with nyloc nuts 125 may be connected at a bottom end of the window frame 110 and the cable anchors 123 may be connected at the top end of the window frame 110.

The hem bar 102 is secured to a bottom end of the shade material 104 such that it runs longitudinally and laterally across the width of the shade material 104 from a first end 105a to a second end 105b. The hem bar 102 may comprise a heavy material, such as steel or aluminum material, or may be weighted, to minimize any movement in the field and allow for a straight hang of the shade material 104. Accordingly, when the shade 100 is in a closed position the weighted hem bar 102 pulls down on the shade material 104 such that it hangs straight, without causing the shade material 104 to buckle or ripple. The hem bar 102 can comprise a solid or a hollow construction with a circular, oval, or other shaped cross section.

The roller shade 100 further comprises a pair of endcaps 130 attached at the two opposite ends 105a and 105b of the hem bar 102. For example, the endcaps 130 may be attached to the hem bar 102 using screws 131. According to another embodiment, endcaps 130 may be integrated with the hem bar 102 such that hem bar 102 and endcaps 130 comprise a single hem bar body. Each endcap 130 is adapted to removably attach to the cable 121 after installation and tensioning of the cables 121. As such, the cables 121 are not needed to be first laced through the endcaps 130 before installation and tightening. This simplifies the installation process and ensures minimal handling of the shade material 104, reducing risk of damage.

Referring to FIGS. 2A through 2E, there is shown a left side endcap 130 in a greater detail, wherein the right side endcap 130 shown in FIG. 1 is a mirror image thereof. In particular, FIG. 2A illustrates a front perspective view of the endcap 130; FIG. 2B illustrates a rear perspective view of the endcap 130; FIG. 2C illustrates a side view of the endcap 130; FIG. 2D illustrates a top view of the endcap 130; FIG. 2E illustrates a front view of the endcap 130; and FIG. 2F illustrates a rear view of the endcap 130. The endcap 130 comprises a hem bar mounting portion 201 and a cable engaging portion 202. The hem bar mounting portion 201 may comprise a first side wall 204 comprising a first surface 205, a second surface 206 oppositely disposed from the first surface 205, a front end 207, and a rear end 208. The first surface 205 may comprises a profile adapted cover an opening in the end of the hem bar 102. A hem bar plug 211 may orthogonally extend from the first surface 205 of the hem bar mounting portion 201 in proximity to the front end 207 of the first side wall 204. Plug 211 may be inserted in the hem bar opening to provide structural support. In addition, two orifices 210 may extend transversely through the first side wall 204 of the hem bar mounting portion 201 and adapted to receive a pair of screws 131 (FIG. 1) for securing the endcap 130 to the hem bar 102.

The cable engaging portion 202 may extend orthogonally from the second surface 206 and in proximity to the rear end 208 of the first side wall 204. The cable engaging portion 202 may comprise a tubular body 203 longitudinally extending from a top end 213 to a bottom end 214. The tubular body 203 may comprise a rectangular cross section defined by a portion of the first side wall 204, a second side wall 216, which is oppositely disposed and parallel to the first side wall 204, as well as a front wall 217, and a rear wall 218. Although, the tubular body 203 of the cable engaging portion 202 may comprise a different shape, such as an oval cross section, a circular cross section, a square cross section, or the like. The tubular body 203 may comprise a channel 212 extending from the top end 213 to the bottom end 214 of the tubular body 203. The channel 212 is sized to receive the cable 121 therein between the first side wall 204, second side wall 216, front wall 217, and rear wall 218.

The cable engaging portion 202 may further comprise a slot 220 that provides an entrance into the channel 212 through a side of the tubular body 203. Slot 220 may extend from the top end 213 of the tubular body 203 to the bottom end 214 of the tubular body 203. According to an embodiment, the slot 220 may comprise an obtuse Z-shaped configuration. Particularly, the slot 220 diagonally traverses the second side wall 216 providing a diagonal opening 225 through the second side wall 216 extending into the channel 212 within the cable engaging portion 202. Diagonal opening 225 may comprise a width 226 (FIG. 2C) slightly larger than the width of the cable 121 such that the cable 121 can pass through the diagonal opening 225.

Slot 220 also traverses the front wall 217 of the cable engaging portion 202 creating a first L-shaped notch 228 in the front wall 217 proximate to the top end 213 of the tubular body 203 of the cable engaging portion 202. First notch 228 creates a first notched opening 231 between the walls forming the first notch 228 and the second side wall 216. First notched opening 231 comprises a width 232 (FIG. 2E) slightly larger than the width of the cable 121 such that the cable 121 can pass into the channel 212 through the first opening 231 between the front wall 217 and the second side wall 216. Similarly, slot 220 also traverses the rear wall 218 of the cable engaging portion 202 creating a second L-shaped notch 229 in the rear wall 218 proximate to the bottom end 214 of the tubular body 203 of the cable engaging portion 202. Second notch 229 creates a second notched opening 234 between the walls forming the second notch 229 and the second side wall 216. Second notched opening 234 comprising a width 235 (FIG. 2F) slightly larger than the width of the cable 212 such that the cable 121 can pass into the channel 212 through the second opening 234 between the rear wall 218 and the second side wall 216. The diagonal opening 225 extends from the first notched opening 231 to the second notched opening 234. As shown in FIG. 2C, the first notched opening 231, the diagonal opening 225, and the second notched opening 234 form the Z-shaped channel 220 in the cable engaging portion 202 adapted for receiving a length of a cable 121 therethrough.

Referring to FIGS. 3A through 3C, there is shown a method of inserting the cable 121 into the channel 212 in the tubular body 203 of the cable engaging portion 202. During installation of the roller shade 100, as discussed above, the cables 121 may be installed in the window frame 110 between the cable mounting brackets 122 and the cable anchors 123 adjacent to and along the length of the side jambs 111. The cables 121 may then be tensioned using the nyloc nuts 125. The roller tube 101 of shade 100 may then be installed between the shade mounting brackets 115 with the shade material 104 rolled about the roller tube 101. As a final step, the hem bar 102 may be secured to the cables 121 via endcaps 130 as described below.

Particularly, the shade material 104 may be first partially unrolled from the roller tube 101 by pulling on the hem bar 102 or by commanding a motor of a motorized roller shade to lower the shade material 104. Referring to FIG. 3A, the channel 212 may be aligned with a first plane P1, while the slot 220 may be aligned with a second plane P2, offset from the first plane P1 by an angle. The installer may position the hem bar 102 between the cables 121 and twist the bottom end of the hem bar 102 upward in direction D1 to align each diagonal opening 225 of each endcap slot 220 disposed on the second plane P2 with the length of the respective cable 121.

FIG. 3B illustrates an angled top view of the endcap 130 and a cross sectional view of cable 121 looking down directly through the diagonal opening 225. Referring to FIG. 3B, the cables 121 are then inserted in direction D2 into each diagonal opening 225 in the second side wall 216 and into first and second notched openings 231 and 234 formed by first and second notches 228 and 229 between the front and rear walls 217 and 218 and the second side wall 216.

Referring to FIG. 3C, the bottom end of the hem bar 102 is then twisted back down in direction D3 capturing the cables 121 within the each channel 212 in the cable engaging portion 202 of the endcaps 130. In this position, the channel 212 disposed on the first plane P1 is aligned with the length of the cable 121. Because the slot 220 is disposed on a second plane P2, it is offset from the channel 212 that runs along the first plane P1, and thereby it is also offset from the length of the cable 121 within the channel 212. Accordingly, the cables 121 are locked within the channels 212 and cannot exit the channels 212 during travel.

According to an alternative embodiment, the Z-shaped slots 220 may be oriented in an opposite direction along endcaps 130 (i.e., mirror image from FIG. 3C) such that to install the hem bar 102, the bottom end of the hem bar 102 needs to be first twisted down to engage the cables 121 within the slots 220, and then twisted back up to capture the cables 121 within the channels 212.

Beneficially, the novel design of the cable retaining slots 220 in hem bar endcaps 130 simplifies the method of installation and ensures minimal handling of the shade material 104 during installation as the shade material does not need to be manipulated during installation or tightening of the cables 121.

In operation, as shown in FIG. 1, as the shade material 104 is raised or lowered, the endcaps 130 travel along the cables 121 via channels 212 directing the bottom end of the shade material 104 to be guided in the direction of the cable length.

INDUSTRIAL APPLICABILITY

The disclosed embodiments provide systems, methods, and modes for a cable guided shade hem bar to cable attachment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A cable guided shade adapted to adjustably cover a structural opening comprising:
   a pair of cables adapted to be secured along opposite sides of the structural opening;
   a shade material extending from a top end and a bottom end;
   a shade drive unit operably connected to the top end of the shade material and adapted to raise and lower the shade material to adjustably cover the structural opening; and
   a hem bar connected across a width of the bottom end of the shade material and comprises a pair of cable engaging portions disposed at two opposite ends of the hem bar, wherein each cable engaging portion comprises:
   a tubular body longitudinally extending from a top end to a bottom end, wherein the tubular body comprises a first side wall and an oppositely disposed second side wall interconnected by a front wall and a rear wall;
   a longitudinal channel extending from the top end to the bottom end through the tubular body;
   wherein the channel comprises a first portion that is aligned with a first plane and is defined by at least portions of the first side wall, the front wall, and the rear wall that extend from the top end to the bottom end of the tubular body;
   wherein the channel comprises a second portion defined by at least portions of the front wall, the rear wall, and the second side wall, wherein the second portion comprises a slot traversing the tubular body from a top end of the tubular body to a bottom end of the tubular body and substantially aligned along a second plane that is offset from the first plane, wherein each slot comprises:
   a diagonal opening traversing the second side wall,
   a first notch in the front wall proximate to the top end of the tubular body creating a first notched opening between the first notch and the second side wall, and
   a second notch in the rear wall proximate to the bottom end of the tubular body creating a second notched opening between the second notch and the second side wall,
   wherein the diagonal opening extends from the first notched openings to the second notched opening;
   wherein each cable engaging portion is adapted to removably and slidably engage one of the secured cables within the channel by inserting a length of the respective cable along the second plane through the slot in the first portion of the channel and into the second portion of the channel;
   wherein when each cable is engaged within the first portion of the channel of the respective cable engaging portion, the cable is substantially aligned along the first plane and is prevented from exiting the respective slot via the front wall and the rear wall at the first portion of the channel.

2. The cable guided shade of claim 1, wherein each cable is secured between a cable mounting bracket and a cable anchor, wherein each cable mounting bracket comprises a tensioning device adapted to adjustably tension the secured cable.

3. The cable guided shade of claim 2, wherein the cables are adapted to be tensioned before being removably engaged by the cable engaging portions of the hem bar.

4. The cable guided shade of claim 1, wherein the hem bar comprises a pair of endcaps attached to the two opposite ends of the hem bar, wherein each endcap comprises one of the cable engaging portions.

5. The cable guided shade of claim 4, wherein each endcap comprises a hem bar mounting portion adapted to be removably attached to one of the ends of the hem bar.

6. The cable guided shade of claim 1, wherein the cable engaging portions are integrated with the hem bar forming a single hem bar body.

7. The cable guided shade of claim 1, wherein the tubular body of each cable engaging portion comprises at least one of a rectangular cross section, an oval cross section, a circular cross section, and a square cross section.

8. The cable guided shade of claim 5, wherein the hem bar mounting portion of each endcap is offset from the cable engaging portion such that the cables are aligned along a first plane and the shade material is aligned substantially along a second plane that is substantially parallel to but offset from the first plane.

9. The cable guided shade of claim 1, wherein the hem bar is adapted to engage the pair of secured cables by:
   twisting the hem bar in a first direction to align the slots of the cable engaging portions with the lengths of the cables;
   inserting the cables through the slots in the first portions of the channels in the cable engaging portions of the hem bar; and
   twisting the hem bar in a second direction, opposite the first direction, to capture the cables within the second portions of the channels in the cable engaging portions.

10. The cable guided shade of claim 8, wherein each endcap comprises the first side wall extending from a front end to a rear end, wherein the cable engaging portion is disposed proximate to the rear end of the first side wall and wherein the hem bar mounting portion is disposed proximate to the front end of the first side wall.

11. The cable guided shade of claim 1, wherein each slot comprises a Z-shaped opening into the channel.

12. The cable guided shade of claim 1, wherein the first side wall comprises a profile adapted to cover and attach to one of the ends of the hem bar.

13. The cable guided shade of claim 1, wherein the slot comprises a Z-shaped opening formed through the second side wall of the tubular body.

14. The cable guided shade of claim 1, wherein each of the first and second notched openings comprise a width larger than a width of one of the cables such that the length of the cable can pass through the first and second notched openings.

15. The cable guided shade of claim 1, wherein each slot comprises a width larger than a width of one of the cables such that the length of the cable can pass through a length of the slot.

16. A cable guided shade adapted to adjustably cover a structural opening comprising:
   a pair of cables adapted to be secured along opposite sides of the structural opening;
   a shade material extending from a top end and a bottom end;
   a shade drive unit operably connected to the top end of the shade material and adapted to raise and lower the shade material to adjustably cover the structural opening; and
   a hem bar connected across a width of the bottom end of the shade material and comprises a pair of cable engaging portions disposed at two opposite ends of the hem bar, wherein each cable engaging portion comprises:
      a tubular body longitudinally extending from a top end to a bottom end, wherein the tubular body comprises a first side wall and an oppositely disposed second side wall interconnected by a front wall and a rear wall;
      a longitudinal channel extending from the top end to the bottom end through the tubular body;
      wherein the channel comprises a first portion that is aligned with a first plane and is defined by at least portions of the first side wall, the front wall, and the rear wall that extend from the top end to the bottom end of the tubular body;
      wherein the channel comprises a second portion defined by at least portions of the front wall, the rear wall, and the second side wall, wherein the second portion comprises a slot traversing the tubular body from a top end of the tubular body to a bottom end of the tubular body, wherein the slot is substantially aligned with a second plane that is offset from the first plane of the longitudinal channel,
      wherein each slot comprises:
         a diagonal opening traversing the second side wall,
         a first notch in the front wall proximate to the top end of the tubular body creating a first notched opening between the first notch and the second side wall, and
         a second notch in the rear wall proximate to the bottom end of the tubular body creating a second notched opening between the second notch and the second side wall,
         wherein the diagonal opening extends from the first notched openings to the second notched opening;
   wherein the hem bar is adapted to removably and slidably engage the pair of cables by:
      twisting the hem bar in a first direction to align each slot in the cable engaging portions with a length of the respective cable along the first plane;
      inserting the cables through the slots into the second portions of the channels in the cable engaging portions of the hem bar; and
      twisting the hem bar in a second direction, opposite the first direction, to capture the cables within the second portions of the channels in the cable engaging portions;
   wherein when each cable is engaged within the first portion of the channel of the respective cable engaging portion, the cable is substantially aligned along the first plane and is prevented from exiting the respective slot via the front wall and the rear wall at the first portion of the channel.

17. A hem bar for a cable guided shade adapted to be removably attached to a pair of cables secured along opposite sides of a structural opening, the hem bar comprises:
   a pair of cable engaging portions disposed at two opposite ends of the hem bar, wherein each cable engaging portion comprises:
      a tubular body longitudinally extending from a top end to a bottom end, wherein the tubular body comprises a first side wall and an oppositely disposed second side wall interconnected by a front wall and a rear wall;
      a longitudinal channel extending from the top end to the bottom end through the tubular body;
      wherein the channel comprises a first portion that is aligned along a first plane and is defined by at least portions of the first side wall, the front wall, and the rear wall that extend from the top end to the bottom end of the tubular body;
      wherein the channel comprises a second portion defined by at least portions of the front wall, the rear wall, and the second side wall, wherein the second portion comprises a slot traversing the tubular body from the top end to the bottom end of the tubular body, wherein the slot is substantially aligned along a second plane that is offset from the first plane,
      wherein each slot comprises:
         a diagonal opening traversing the second side wall, a first notch in the front wall proximate to the top end of the tubular body creating a first notched opening between the first notch and the second side wall, and a second notch in the rear wall proximate to the bottom end of the tubular body creating a second notched opening between the second notch and the second side wall, wherein the diagonal opening extends from the first notched openings to the second notched opening;

wherein the hem bar is adapted to removably and slidably engage the pair of cables by:

twisting the hem bar in a first direction to align each slot in the cable engaging portions with a length of the respective cable along the first plane;

inserting the cables through the slots into the second portion of the channels in the cable engaging portions of the hem bar; and twisting the hem bar in a second direction, opposite the first direction, to capture the cables within the second portions of the channels in the cable engaging portions;

wherein when each cable is engaged within the first portion of the channel of the respective cable engaging portion, the cable is substantially aligned along the first plane and is prevented from exiting the respective slot via the front wall and the rear wall at the first portion of the channel.

18. A method for removably attaching the hem bar of the cable guided shade of claim 1, the method comprising the steps of:

twisting the hem bar in a first direction to align each slot in the cable engaging portions with a length of the respective cable along the first plane;

inserting the cables through the slots into the second portions of the channels in the cable engaging portions of the hem bar; and twisting the hem bar in a second direction, opposite the first direction, to capture the cables within the second portions of the channels in the cable engaging portions.

* * * * *